US007018096B2

(12) United States Patent
Benjamin

(10) Patent No.: US 7,018,096 B2
(45) Date of Patent: Mar. 28, 2006

(54) PACKED PRODUCT TEMPERATURE MEASURING DEVICE

(75) Inventor: Larry D Benjamin, Henderson, NC (US)

(73) Assignee: Universal Leaf Tobacco Company, Inc., Richmond, VA (US)

( * ) Notice: Subject to any disclaimer, the term of this patent is extended or adjusted under 35 U.S.C. 154(b) by 0 days.

(21) Appl. No.: 10/627,922

(22) Filed: Jul. 28, 2003

(65) Prior Publication Data

US 2004/0213323 A1 Oct. 28, 2004

Related U.S. Application Data

(60) Provisional application No. 60/465,205, filed on Apr. 25, 2003.

(51) Int. Cl.
*G01K 7/06* (2006.01)
*G01K 1/14* (2006.01)
*G01K 13/00* (2006.01)

(52) U.S. Cl. ...................... 374/179; 374/208; 374/148; 374/141

(58) Field of Classification Search ................ 374/163, 374/164, 179, 208, 148
See application file for complete search history.

(56) References Cited

U.S. PATENT DOCUMENTS

| | | | | |
|---|---|---|---|---|
| 1,037,210 A | | 9/1912 | Curphey et al. | |
| 2,734,382 A | | 2/1956 | Wassmer | |
| 2,861,454 A | | 11/1958 | Rahlson | |
| 3,147,457 A | * | 9/1964 | Gill et al. | 374/163 |
| 3,199,353 A | | 8/1965 | Burnight | |
| 3,332,285 A | | 7/1967 | Cook | |
| 3,832,669 A | | 8/1974 | Mueller et al. | |
| 3,896,674 A | | 7/1975 | Kolb | |
| 3,915,003 A | | 10/1975 | Adams | |
| 4,072,059 A | | 2/1978 | Hamilton | |
| 4,101,343 A | * | 7/1978 | Feichter et al. | 136/230 |
| 4,158,965 A | | 6/1979 | Prosky | |
| 4,183,248 A | | 1/1980 | West | |
| 4,191,197 A | * | 3/1980 | Benzinger | 374/168 |
| 4,217,463 A | * | 8/1980 | Swearingen | 374/179 |
| 4,444,990 A | * | 4/1984 | Villar | 136/221 |
| 4,595,300 A | | 6/1986 | Kaufman | |
| 4,653,935 A | * | 3/1987 | Daily et al. | 374/208 |
| 4,721,534 A | * | 1/1988 | Phillippi et al. | 136/234 |
| 4,790,198 A | | 12/1988 | Awtry et al. | |
| 4,830,515 A | * | 5/1989 | Cortes | 374/208 |
| 4,838,705 A | | 6/1989 | Byers, Jr. et al. | |
| 4,866,997 A | | 9/1989 | Kaufman | |
| 4,989,992 A | * | 2/1991 | Piai | 374/141 |
| 5,035,514 A | | 7/1991 | Newman | |
| 5,131,759 A | * | 7/1992 | Eiermann et al. | 374/208 |
| 5,139,345 A | | 8/1992 | Schafer et al. | |

(Continued)

*Primary Examiner*—Gail Verbitsky
(74) *Attorney, Agent, or Firm*—Pillsbury Winthrop Shaw Pittman, LLP

(57) ABSTRACT

A temperature probe includes an elongated longitudinal tubular shaft having a hollow interior, an insulating structure mounted on the elongated shaft, and a heat conducting structure constructed of a metallic material coupled to the insulating structure. A thermocouple is coupled to the heat conducting structure and extends into the hollow interior of the elongated shaft. A control device is electrically communicated to the thermocouple and is operable to determine a temperature from the thermocouple. When the heat conducting structure is disposed within a mass of packed product, the heat conducting structure transmits thermal energy from the mass to the thermocouple and the insulting structure thermally isolates the heat conducting structure from the tubular shaft.

29 Claims, 4 Drawing Sheets

U.S. PATENT DOCUMENTS

| | | | | |
|---|---|---|---|---|
| 5,662,418 | A * | 9/1997 | Deak et al. | 374/144 |
| 5,697,706 | A * | 12/1997 | Ciaravino et al. | 374/166 |
| 6,000,845 | A | 12/1999 | Tymkewicz et al. | |
| 6,089,110 | A | 7/2000 | Pallotta et al. | |
| 6,135,634 | A | 10/2000 | Hay et al. | |
| 6,146,015 | A | 11/2000 | Weiss | |
| 6,202,480 | B1 * | 3/2001 | Mauze et al. | 374/109 |
| 6,231,230 | B1 * | 5/2001 | Baldock et al. | 374/208 |
| 6,250,802 | B1 | 6/2001 | Dotan | |
| 6,325,535 | B1 * | 12/2001 | Gibson et al. | 374/29 |
| 6,332,709 | B1 | 12/2001 | Burke et al. | |
| 6,352,361 | B1 * | 3/2002 | Nimberger et al. | 374/208 |
| 6,390,670 | B1 * | 5/2002 | Nimberger et al. | 374/142 |
| 6,543,934 | B1 * | 4/2003 | Hammer et al. | 374/134 |
| 6,690,016 | B1 * | 2/2004 | Watkins et al. | 250/341.7 |
| 6,712,996 | B1 * | 3/2004 | Wu et al. | 374/162 |
| 6,827,486 | B1 * | 12/2004 | Welker | 374/147 |
| 2002/0196834 | A1 * | 12/2002 | Zaldivar et al. | 374/179 |

* cited by examiner

PACKED PRODUCT TEMPERATURE MEASURING DEVICE

CROSS REFERENCE TO RELATED APPLICATIONS

This application claims priority to U.S. Provisional Patent Application No. 60/465,205, which was filed on Apr. 25, 2003 and is incorporated herein in its entirety by reference.

BACKGROUND OF THE INVENTION

1. Field of the Invention

The present invention is generally directed to devices that measure the internal temperature of various products and to methods for using these devices. More particularly, the invention is directed to temperature probes for determining the internal temperature of a mass of tobacco product.

2. Discussion of Related Art

Tobacco leaves or leaf parts and other plant products are often stored as densely packed masses. Chemical reactions occur in moist plant matter which generate heat. Leaves and leaf parts typically have insulating properties which tend to prevent heat from escaping from the leaf mass to the ambient atmosphere. Consequently, when a tobacco leaf product (e.g., whole leaves or leaf parts such as the leaf lamina strips) are stored in a densely packed mass, the internal temperature of the leaf mass may rise. If the internal temperature of the tobacco leaf mass becomes too high, the tobacco leaf product may be damaged. At high temperatures, tobacco may change color, for example, or may carbonate, destroying the commercial value of the tobacco.

Several factors may need to be considered to successfully store packed tobacco, including sugar content, moisture content, and the temperature of the packed tobacco product. In some instances, the internal temperature of a tobacco leaf product mass may become high enough to cause spontaneous combustion, which can result in unwanted carbonization of the stored product that turns the product black and renders the tobacco commercially unusable.

Tobacco leaf product is generally enclosed within a container for storage, especially when received from a farmer or warehouse in loose form for packaging and transport to a manufacturer. Typical containers include a hogshead, which is a large cylindrical wooden container that holds approximately 900 pounds of product, and a PM80, which is a large, durable cardboard container capable of holding approximately 700–800 pounds of product. After a container is packed, the temperature is measured at or in the vicinity of the center mass of the tobacco to determine the "pack temperature" and then the container is covered. Thus, to prevent heat damage to tobacco, it is important to be able to determine the internal temperature of packed leaves.

Generally, if the internal temperature of a mass of tobacco product is below a threshold temperature at the time the tobacco product is enclosed within a container, the tobacco product can be stored without incurring heat damage, even when the storage is for a lengthy period. If the internal temperature is above a certain temperature, the container must be pulled from the line and reprocessed.

Known methods of measuring temperature have included removing a sample of tobacco from the interior of the leaf mass and measuring the temperature of the sample, which does not accurately predict the actual temperature within the package. Other methods use manual probes in the form of dial thermometers that are inserted into the bale and allowed to equilibrate over a period of eight to twelve hours before measuring the temperature. Both of these methods are performed when the bale is off line. Traditional methods and apparatuses for determining the internal temperature of a mass of tobacco leaf product have been time consuming, inaccurate, inefficient and/or costly.

SUMMARY OF THE INVENTION

An aspect of the invention is directed to a temperature probe for measuring the internal temperature of a mass of packed tobacco product. The temperature probe comprises an elongated tubular shaft having a hollow interior, an insulating structure mounted on the elongated shaft, a heat conducting structure coupled to the insulating structure, a thermocouple coupled to the heat conducting structure and extending into the hollow interior of the elongated shaft, and a control device electrically communicated to the thermocouple and operable to determine a temperature from the thermocouple. When the heat conducting structure is disposed within a mass of packed product, the heat conducting structure transmits thermal energy from the mass to the thermocouple and the insulating structure thermally isolates the heat conducting structure from the tubular shaft.

Another aspect of the invention is directed to method of determining an internal temperature of a product mass product, comprising providing a mass of product, providing a temperature probe comprising an elongated tubular shaft having a hollow interior, an insulating structure mounted on the elongated shaft, a heat conducting structure coupled to the insulating structure, a thermocouple coupled to the heat conducting structure and extending into the hollow interior of the elongated shaft, and a control device connected to the thermocouple and operable to determine a temperature from the thermocouple. The method includes determining the temperature of the heat conducting structure, comparing the temperature of the heat conducting structure to a predetermined temperature range to determine if the temperature of the heat conducting structure is within the predetermined range, changing the temperature of the heat conducting structure if the temperature of the heat conducting structure is outside of the predetermined temperature range so that the temperature of the heat conducting structure is within the predetermined temperature range, inserting the probe into the mass so that the heat conducting structure is disposed in thermal communication with the product on the interior of the mass, and determining the internal temperature of the mass based on information from the probe.

A further aspect of the invention is directed to a temperature probe assembly mounted for insertion into a product mass for measuring an internal temperature of the mass, comprising an insulated shaft, a heat conducting structure mounted on an end of the insulated shaft, a temperature controller coupled to the heat conducting structure that maintains the heat conducting structure within a desired temperature range prior to insertion of the shaft into the mass, and a temperature sensor coupled to the heat conducting structure that measures the internal temperature of the mass when the probe assembly is inserted into the mass.

Other aspects, features, and advantages of the invention will become apparent from the following detailed description of the illustrated embodiments, the accompanying drawings, and the appended claims.

DETAILED DESCRIPTION OF PREFERRED EMBODIMENTS

The present invention is directed to devices that are used to determine the internal temperature of packed products and to example methods for using these devices. Aspects of the present invention are explained and described using illustrative embodiments of the invention in the form of probes that can be used to determine the internal temperature of a mass of tobacco product, but these illustrative embodiments are not intended to limit the scope of the invention. Rather, the principles of the present invention can be applied to construct a wide range of temperature probes that can be used for a wide range of applications.

For example, aspects of the present invention can be applied to construct temperature probes that can be used to measure the temperature of many different types of materials and many different types of products. These products include, but are not limited to, a wide range of plant products and a wide range of agricultural products, such as hay or cotton.

Figure 1:
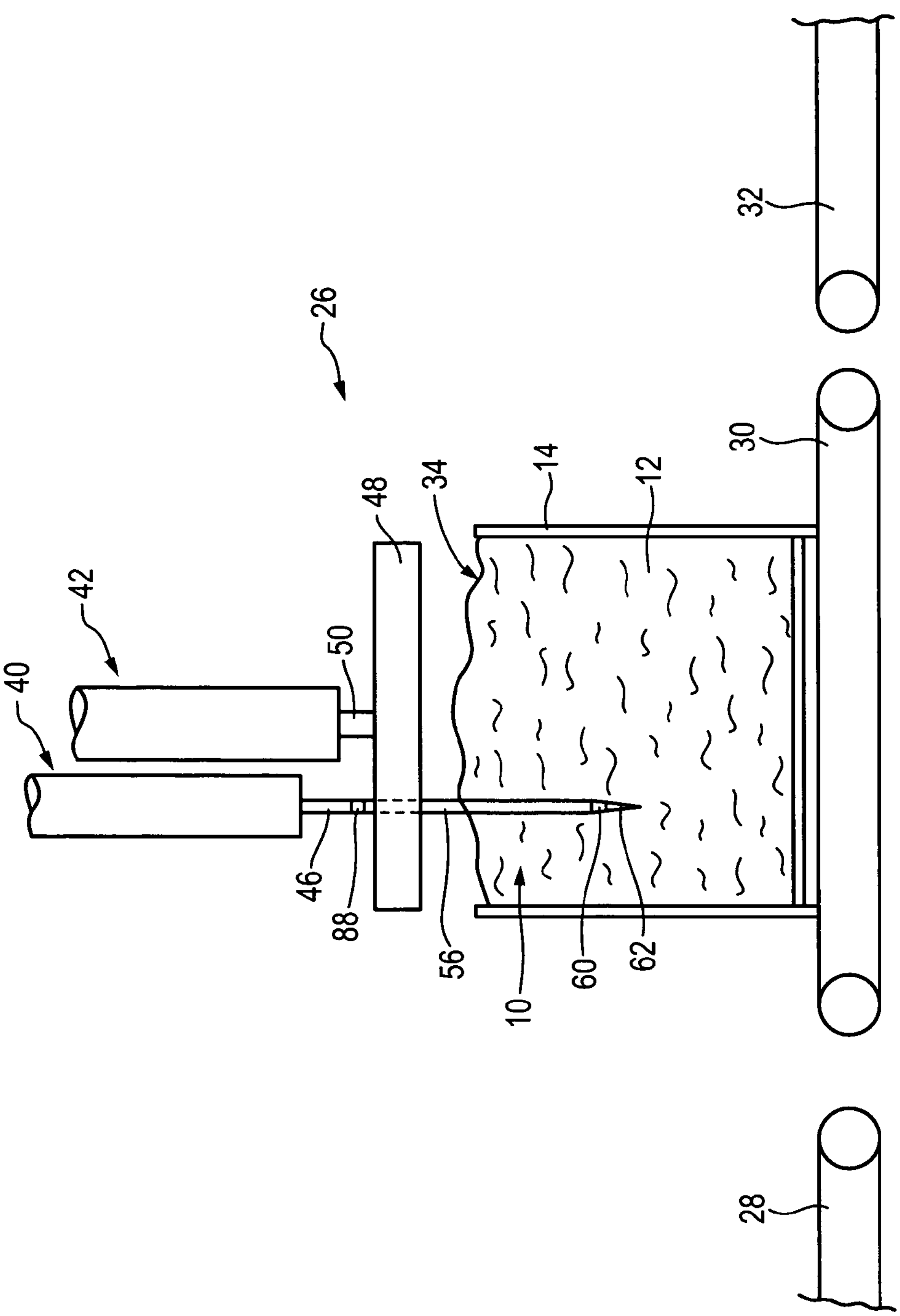
FIG. 1 shows an example of a head out press that includes a illustrative embodiment of a temperature probe constructed according to principles of the present invention.

FIG. 1 shows an illustrative embodiment of a temperature probe 10 constructed according to some of the principles of the present invention. The temperature probe 10 is shown inserted in a mass of tobacco leaf product 12 that is disposed within a container 14. A portion of the temperature probe 10 is shown in enlarged view in FIG. 4. The temperature probe 10 is preferably a contact temperature measuring device constructed to minimize thermal invasion and thermal shunting of the target material, which is discussed in detail below.

The probe 10 may be used to measure the temperature of an agricultural product or similar product that has excellent insulating properties (e.g., cotton or tobacco) because the probe 10 is minimally thermally invasive and is capable of measuring temperature quickly. For example, the temperature probe 10 can quickly determine the internal temperature of a mass of a packed product such as tobacco (e.g., in a period of time ranging from about 20 second to about 90 seconds depending upon several factors and conditions including, for example, the accuracy of the temperature measurement desired, the exact construction of the temperature probe 10, ambient environmental conditions and other operating conditions under which the probe is used).

The temperature probe 10 may be used for a wide variety of applications including a variety of manufacturing or processing operations. For example, the temperature probe 10 may be used as an in line device to measure the temperature of packed tobacco products during a tobacco processing operation. Because of the short period of time in which a temperature is determined using the temperature probe 10, the temperature probe 10 can be used, for example, to measure the temperature of every container of tobacco on an assembly or processing line without slowing down the tobacco product manufacturing or processing operation.

Figure 2:
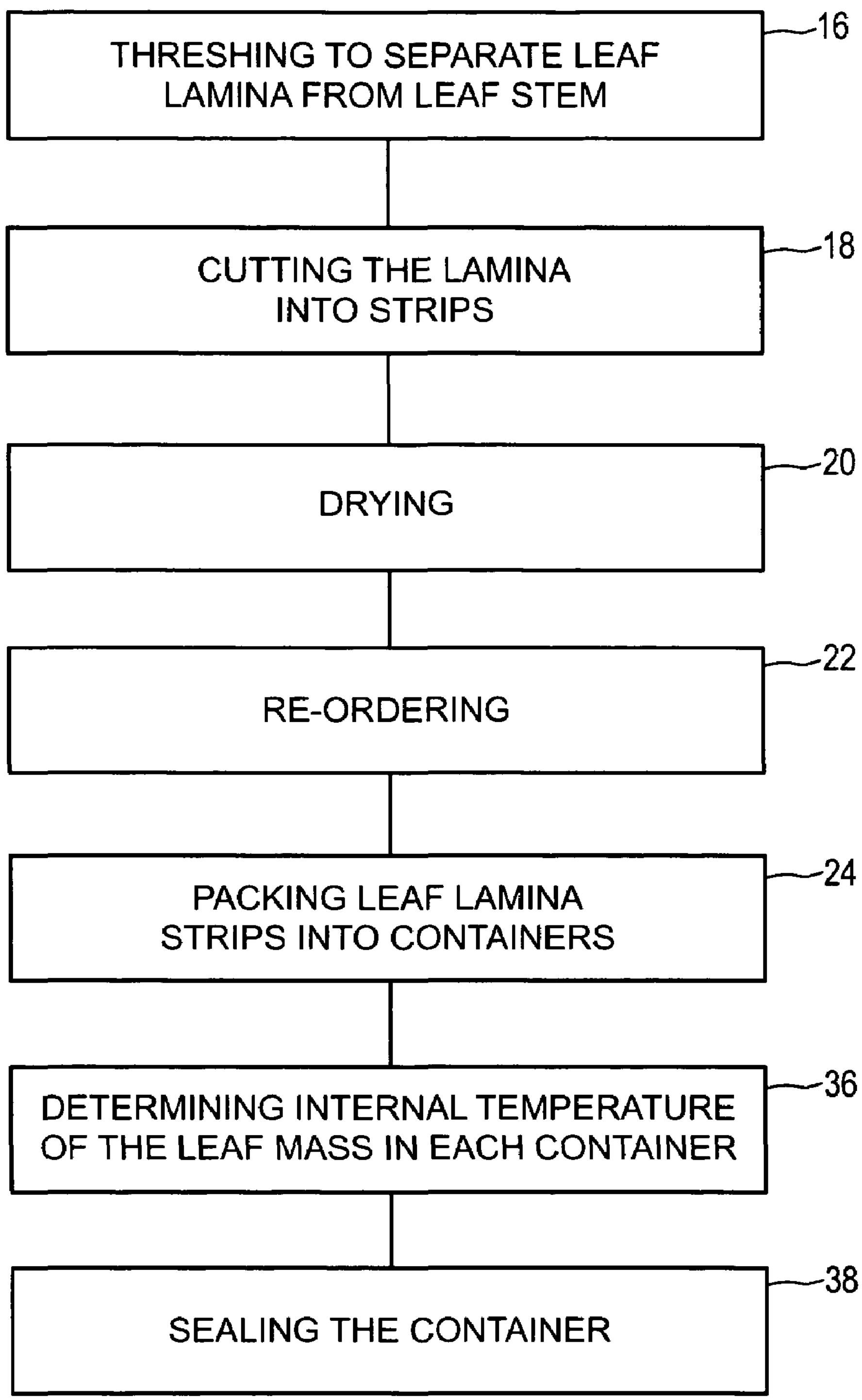
FIG. 2 is a flow chart of some of the processing steps that may be carried out in a tobacco stemmery in accordance with the invention.

Tobacco leaves are processed and packed for storage in many commercial settings including in tobacco stemmeries. Some of the processing steps that may occur in a stemmery are shown in FIG. 2. A stemmery may receive whole tobacco leaves from a warehouse or from tobacco farmers in a loose or pre-baled form. Each whole tobacco leaf includes a stem portion and a lamina portion. The tobacco leaves may be threshed at 16 at a threshing station to separate the stem from the lamina. The leaf lamina and the stems may be collected in separate containers and processed separately from one another. The leaf lamina from a particular tobacco crop may be pre-blend with tobacco from another tobacco crop and then cut at 18 into strips that are of appropriate size and shape for making cigarettes, for example, or other tobacco products.

The leaf lamina strips are dried at 20 to reduce the moisture content of the tobacco and to prepare the tobacco for storage. A typical pack moisture for tobacco is approximately 12.5 percent moisture by weight. During the drying process, the leaf lamina strips may be dried to a point that they have less moisture than their normal pack moisture. For example, the moisture may be removed from green leaf lamina strips to the point that the moisture content of the leaf lamina strips is about 10 percent moisture by weight. The tobacco product may then be re-ordered at 22, if necessary, to increase its moisture content up to its desired pack moisture level (e.g., 12.5 percent moisture by weight). Re-ordering may include sending the leaf lamina strips through a multi-stage re-ordering unit or station that adds steam and/or water to the tobacco in a controlled manner. The re-moisturizing that occurs during re-ordering helps assure that the leaf laminate strips can be handled and processed without fragmenting.

After re-ordering, the mass of leaf lamina strips is typically in a light and fluffy condition. The leaf lamina strips are pressed at 24 into a series of containers for storage and shipment. Tobacco enclosed in a container may be stored for long periods of time (e.g., five years). After a quantity of leaf lamina is pressed into containers, each container 14 is weighed and tobacco may be added or subtracted so that each container 14 has the desired weight.

After each tobacco container 14 contains the desired weight of tobacco, the containers 14 are processed in succession in a head out press 26. The main components of a head out press 26 are represented in FIG. 1. Each container 14 may enter, be transported through, and exit the head out press 26 via a conveyor belt 28, 30, 32, respectively. The temperature probe 10 may be mounted on the head out press 26 so that the internal temperature of the tobacco in each container 14 can be measured before the container 14 is sealed at the head out press 26.

Figure 3:
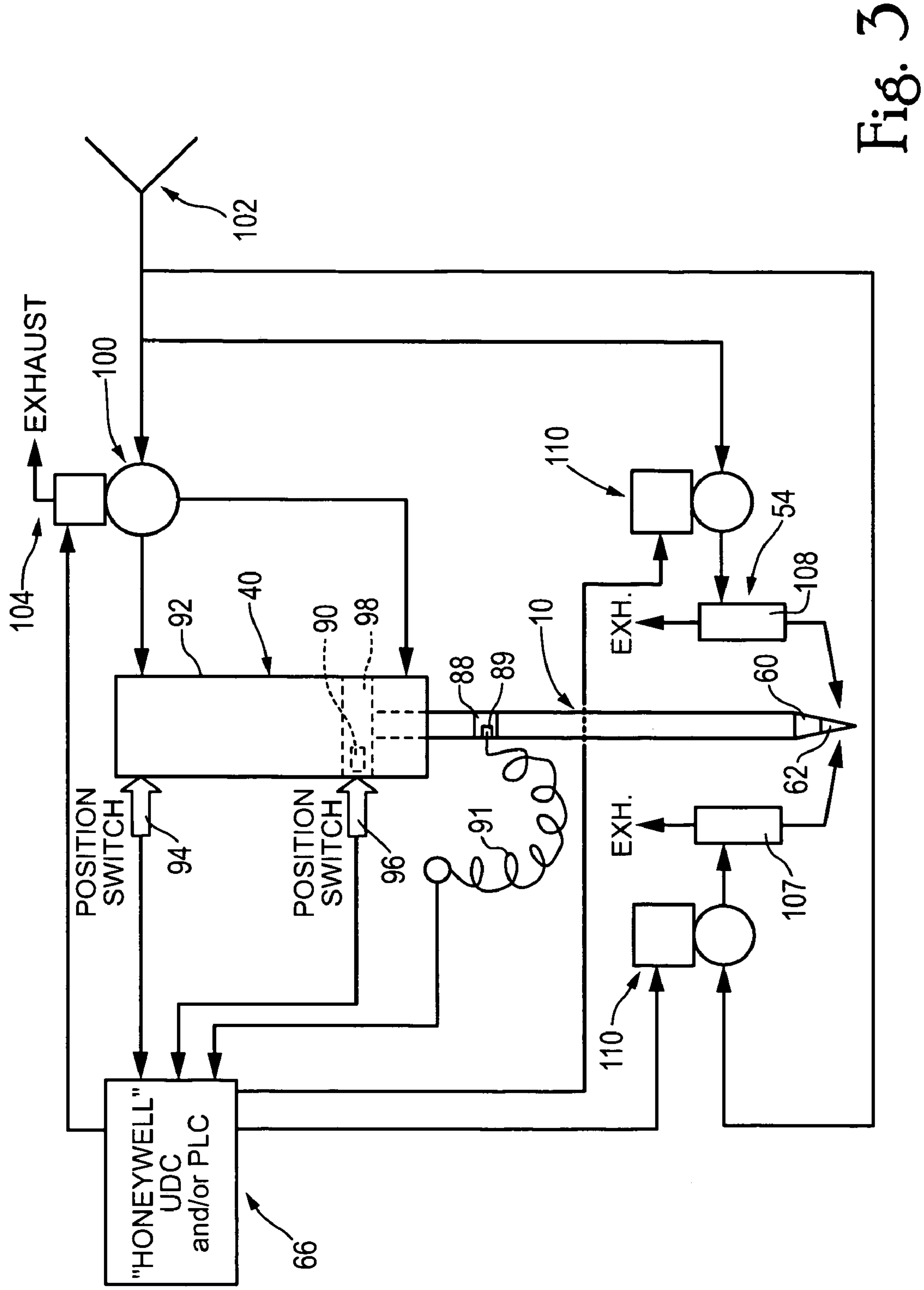
FIG. 3 is a schematic representation of a temperature detection system that may be used to determine the internal temperature of a mass of a material or product.

The container 14 (shown in schematic cross-section in FIG. 1) has a top opening 34. Conveyor belt 28 moves the container 14 to conveyor belt 30 which carries the container 14 into the head out press 26. The operation of the head out press 26 and the conveyor belts 28, 30, 32 may be controlled by a programmable logic device such as control device 66. For example, the control device 66 may be programmed to coordinate the starting and stopping of the conveyor belts 28, 30, 32 and the operation of the head out press 26. The control device 66, which is represented in FIG. 3, may be programmable logic controller (PLC), a relay/timer logic, a general purpose computer or other appropriate control device. In the example of FIG. 3, preferably the control device 66 is a Universal Digital Controller (UDC) manufactured by and commercially available from the Honeywell Corporation. It is also contemplated that the control device for the head out press 26 and conveyors be separate from the control device 66 for the temperature probe 10. In any case, any known programmable logic controller may be used.

Generally, the head out press 26 is operable to insert the temperature probe 10 into the tobacco leaf product 12 in the container 14 for a predetermined period of time to determine the internal temperature of the tobacco leaf product 12 at step 36 (see FIG. 2) and to remove the temperature probe 10 from the tobacco mass 12. It can also be used to press a lid or cover onto the container 14 to seal the top opening 34 of the container 14 at 38 (FIG. 2). However, if desired, the lid control can be a separate logic loop. The conveyor belt 30 then moves the container 14 to the conveyor belt 32 which moves the container 14 to a strapping station where straps are placed around the container 14 to hold the lid tightly on the container.

The steps of threshing, pre-blending, cutting into strips, drying, re-ordering, and packing of the tobacco into containers may be carried out at a series of machines or stations on a factory floor and may be carried out as a substantially continuous process or as a set of sub processes. This continuous process may be controlled by a human operator, by one or more programmable logic devices or general purpose computers, or may be controlled in part by human operators and in part by programmable logic devices or general purpose computers. A series of conveyor belts may be used to transport the tobacco between stations.

The head out press 26 (including the temperature probe 10) is described and illustrated as being controlled and operated by an illustrative embodiment of a control system, but this is not intended to be limiting. The head out press 26 (including the temperature probe 10) can be controlled by many types of devices or may be controlled manually by one or more human operators. Furthermore, it can be appreciated that the control system described herein can also be used to control and/or monitor other machines or processing steps, including some or all of the machines or processing steps that may be employed during the processing of a tobacco product as at a tobacco stemmery.

The head out press 26 includes a pair of pneumatic (or, alternatively, hydraulic) cylinders 40, 42 mounted on a metal frame (not shown) of the head out press 26. The temperature probe 10 is mounted on the piston rod 46 of the pneumatic cylinder 40. An lid mounting plate 48, which may be in the form of a large disk or plate, is mounted on the piston rod 50 of the pneumatic cylinder 42. The plate 48 is constructed to apply a force to a cover or lid (not shown) to mount the cover on the container 14 to cover the container opening 34.

When the container 14 enters the head out press 26, there is no cover on the container 14. The pneumatic cylinder 40 is actuated to insert the temperature probe 10 approximately into the center or in the vicinity of the center of the tobacco product 12 in the container 14. If the temperature is below a predetermined level, the temperature probe 10 is withdrawn from the tobacco leaf mass 12 and a cover is placed on the container 14. The pneumatic cylinder 42 is actuated to move the plate 48 against the cover to push the cover onto the container. The direction of movement of the rod 50 of the pneumatic cylinder 42 is then reversed to move the plate 48 away from the cover. A control device, such as control device 66, then actuates the conveyor belts 30 and 32 to move the container 14 onto the conveyor belt 32. The conveyor belt 32 may carry the container 14 to a strapping station where straps are placed around the container 14.

FIG. 3 shows a schematic illustration of the temperature probe 10, the pneumatic cylinder 40, the control device 66, and a heating and cooling system 54. The heating and cooling system 54 may be controlled by the control device 66 and may be operated to raise or lower the temperature of the heat conducting structure 62 of the temperature probe 10 prior to insertion of the temperature probe 10 into the tobacco product 12 of a container 14 in the head out press 26.

Figure 4:
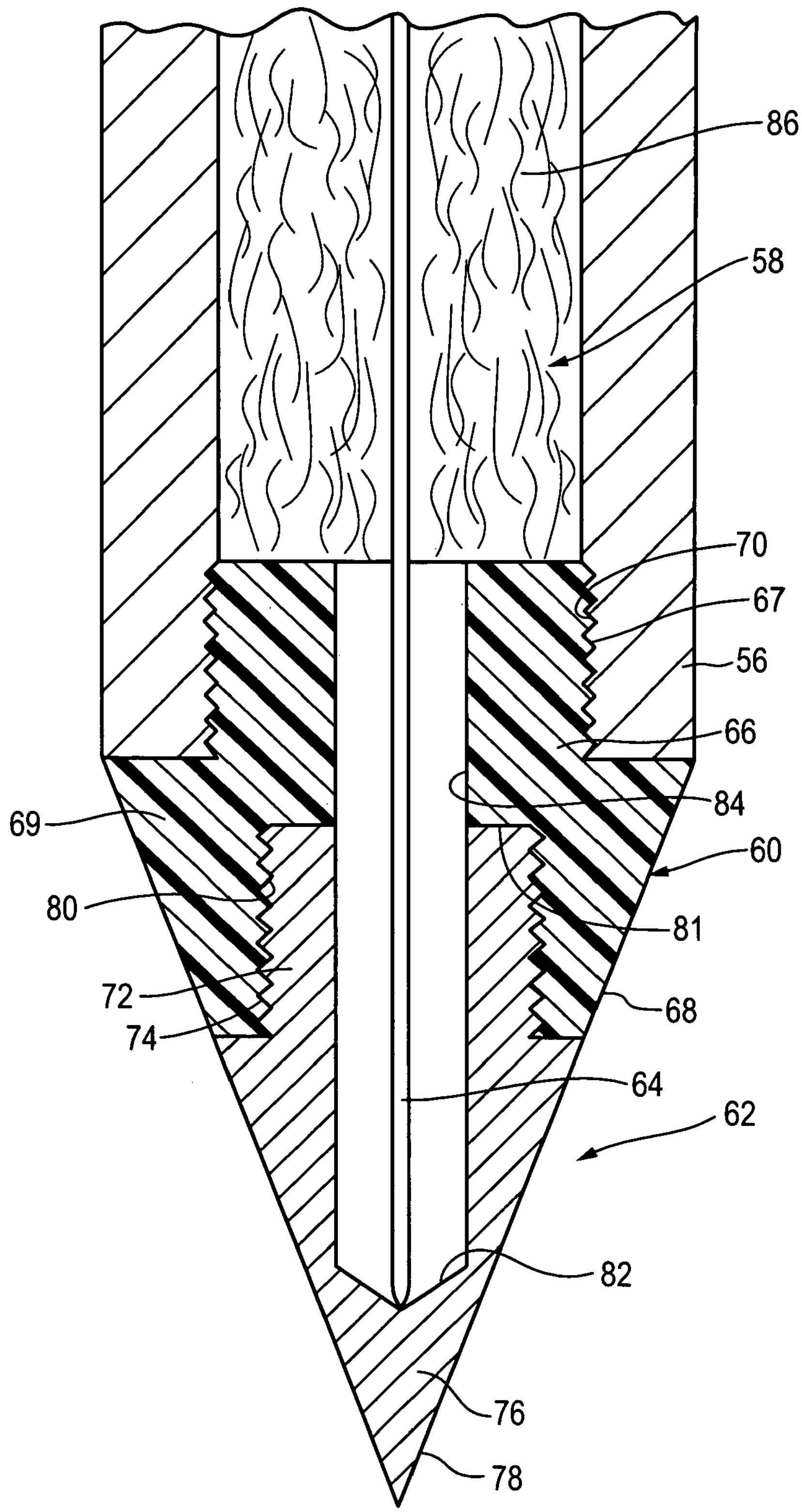
FIG. 4 is an enlarged cross-sectional view of a portion of the temperature probe of FIG. 1.

As seen in detail in FIG. 4, the temperature probe 10 includes an elongated longitudinal tubular shaft 56, an insulating structure 60, a heat conducting structure 62 and a thermocouple 64. The thermocouple 64 is coupled to the heat conducting structure 62. When the temperature probe 10 is inserted into a mass of tobacco product, heat from the mass 12 is transmitted through the heat conducting structure 62 to the thermocouple 64. The thermocouple 64 is electrically communicated to a control device 66 (see FIG. 3). The control device 66 is operable to determine a temperature from an electrical input received from the thermocouple 64. The insulating structure 60 thermally insulates the heat conducting structure 62 from the tubular shaft 56.

The tubular shaft 56 is an elongated structure constructed to have sufficient strength and rigidity to penetrate a mass of packed tobacco product and sufficient length to deliver the heat conducting structure 62 into the mass of the tobacco product 12. Preferably, the heat conducting structure 62 is at, substantially near, or in the vicinity of the center of mass 12 of the tobacco when the temperature is measured. The tubular shaft 56 may be constructed of a metallic material of sufficient strength and that will not contaminate the product. Examples of suitable metals include stainless steel and mild steel. The shaft 56 has a hollow interior 58. The shaft 56 may have a circular or ring-shaped transverse cross-section, although this is not required.

The insulating structure 60 is preferably mounted on an end of the tubular shaft 56, although this is not required. The insulating structure 60 may be constructed of a thermally stable plastic material that exhibits a low degree of thermal conductivity (i.e., a material that functions as a thermal insulator) so that the heat conducting structure 62 is thermally isolated or insulated from the shaft 56. Preferably the insulating structure 60 forms part of a pointed tip on the free end of the probe 10 and is constructed of a material that has a relatively low coefficient of friction to facilitate penetration of the probe 10 into the mass 12. A preferred plastic material is a high impact polycarbonate such as Lexan®. Preferably the insulating structure 60 is pervious to the passage of radiant energy to allow, for example, heat energy to radiate through the insulating structure 60 into the heat conducting structure 62.

The insulating structure 60 has a cylindrical portion 66 that includes external threading 67 and a frustoconical portion 69 having a frustoconical exterior surface portion 68. The insulating structure 60 is secured to the shaft 56 by threadedly engaging the external threading 67 on the insulating structure 60 with internal threading 70 on the interior of an end portion of the shaft 56. The shape and frictional characteristics of the surface portion 68 facilitate penetration of the probe into the mass of tobacco. Other suitable streamlined shapes could also be used.

The heat conducting structure 62 is constructed of a metallic material and is coupled to the insulating structure 60. The heat conducting structure 62 is preferably constructed of a metallic material that has a high thermal conductivity, is hard enough to penetrate a mass of material without damage, and will not contaminate the tobacco product. Examples of suitable metallic materials include brass, platinum and gold. The heat conducting structure 62 is preferably an integral structure that includes a cylindrical portion 72 that includes external threading 74 and a conical portion 76 that includes a conical exterior surface 78. The heat conducting structure 62 is coupled to the insulating structure 60 by threaded engagement between the threading 74 on the heat conducting structure 62 and internal threading 80 on the interior of a recess 81 formed in the insulating structure 60. Other forms of connection could also be used, such as a snap fit or splined connection. The conical exterior surface 78 of the heat conducting structure 62 is shaped to form a sharp point or tip. The surfaces 68, 78 on the insulating structure 60 and the heat conducting structure 62, respectively, are shaped to provide a penetrating tip on the end of the temperature probe 10.

A well or recess 82 is formed (e.g., by machining) in the heat conducting structure 62 to reduce the mass thereof and to reduce the thickness thereof. Heat from the material that is being measured flows through the heat conducting structure 62 to the thermocouple 64 causing the thermocouple 64 to generate a millivoltage that is communicated to the control device 66. When the temperature probe 10 is in place within a tobacco mass 12, some of the tobacco product is in contact with the heat conducting structure 62. Heat from the tobacco product that is in contact with the heat conducting structure 62 is conducted through the conical surface 78. As mentioned, radiant heat (e.g., infrared radiation) from the tobacco mass 12 passes through the insulating structure 60 and is absorbed by the heat conducting structure 62 (for example, in the region where the threads 74 are formed).

Generally, when the heat conducting structure 62 is in the interior of a mass of tobacco 12, heat flows through the conical exterior surface 78 into the heat conducting structure 62. The surface area 78 is relatively large and the heat conducting structure 62 is constructed such that heat flowing through the relatively large surface area 78 passes through one or more regions of reduced area (e.g., reduced surface area) so that the heat conducting structure 62 functions as a thermal choke. Preferably, the thermocouple 64 is coupled to the heat conducting structure 62 substantially in a region that will experience maximum heating due to the thermal choke construction.

The thermocouple 64 extends through a passageway or opening 84 in the insulating structure 60 and into the hollow interior 58 of the shaft 56. Preferably the thermocouple 64 is a grounded junction type T thermocouple micro fine wire. A micro fine thermocouple has a thickness in the thousandths of an inch range. The size of the thermocouple 64 is exaggerated in FIG. 4 for purposes of illustration. Since the thermocouple 64 is micro fine, it absorbs minimal levels of thermal energy to minimize thermal shunting and thermal invasion when the probe is inserted in a tobacco product. The thermocouple 64 may be, for example, constructed of copper and constantan.

The thermocouple 64 may be secured to the heat conducting structure 62 by soldering or by other methods. When soldering is used, a silver solder may be used to facilitate heat transfer between the heat conducting structure 62 and the thermocouple 64. A support structure may be provided within the hollow interior of the shaft 56 to support all of or a portion of the thermocouple 64 within the interior 58, if desired. The support structure may be provided in the form of a plurality of cotton fibers or natural cotton wool 86. The support structure 86 supports the thermocouple 64 and prevents the thermocouple 64 from moving relative to the shaft 56 during movement of the probe 10. The support structure 86 protects the thermocouple 64 and protects the connection between the thermocouple 64 and the heat conducting structure 62 from damage.

A schematic representation of an illustrative temperature measuring system that may be utilized when the temperature probe 10 is mounted on a head out press 26 is shown in FIG. 3. The system of FIG. 3 includes the pneumatic cylinder 40, the temperature probe 10, the control device 66 and related structures and assemblies. The particular shaft 56 in the example of FIG. 3 is a stainless steel pipe having a one inch diameter and length of thirty six inches. This length enables the probe 10 to be used to measure the internal temperature of tobacco in a container having a wide range of different heights. The heat conducting structure 62 preferably forms a ⅝" long conically shaped "point" made of brass on the end of the probe 10. The insulating structure 60 is preferably made of Lexan® and preferably the length of the insulating structure 60 from the end of the shaft 56 to the top of the exposed portion of the heat conducting structure 62 is 2 and ⅛" long. The insulating structure 60 is screwed into the stainless steel pipe (as shown in FIG. 4) and may also be secured to the shaft 56 by a set screw.

The upper end of the shaft 56 is secured to the piston rod 46 by an adapter or connector 88. The free end of the piston rod 46 and the upper end of the shaft 56 may each be externally threaded and the connector 88 may be internally threaded to enable the structures 46, 88, and 10 to be threadedly connected or mechanically screwed to one another. A thermocouple jack 89 is mounted in the connector 88 and is connected to the second end of the thermocouple 64. The thermocouple 64 is electrically connected to the control device 66 by a flexible coiled extension cable 91. One end of the cable is configured to be plugged into the jack 89.

The pneumatic cylinder 40 in FIG. 3 may be a linear pneumatic cylinder having a five inch diameter and a sixty inch stroke. A magnet 90 may be mourned within the piston 98 and magnetic reed switches 94, 96 may be mounted on the cylinder 92 of the pneumatic cylinder 40. The reed switches 94. 96 generate feedback signals that are communicated to control device 66. The control device 66 may be programmed to use these feedback signals to control positioning (extension and retraction) of the probe 10. Several reed switches may be disposed along the length of the pneumatic cylinder 40 to enable the control device 66 to stop the temperature probe 10 in one of a wide range of extended positions to accommodate a range of container sizes having different container heights.

The pneumatic cylinder 40 may be selected to have the capability of generating a pressure of 100 pounds per square inch gauge (PSIG) or more to enable the temperature probe 10 to penetrate a densely packed tobacco product mass. The cylinder 40 (and therefore the temperature probe 10) may be vertically mounted (i.e., the cylinder 40 and probe 10 may be oriented vertically so that the probe moves along a vertical path between its extended and retracted probe positions), but this orientation is not required. The cylinder 40 is preferably mounted on the head out press 26 and operable to insert the probe 10 so that the heat conducting structure 62 is positioned at or close to the center of the tobacco product mass 12 when the probe 10 is in its extended position. Preferably, the pneumatic cylinder 40 and the temperature probe 10 are mounted so that the probe is substantially "plumb" to the mass of tobacco 12 within container 14 during penetration.

The flow of pressurized air to the pneumatic cylinder 40 may be controlled by a center blocking, two coil, 4-way solenoid valve 100 designed for double acting cylinder operation. The valve 100 is electrically communicated to the control device 66 to enable the control device 66 to receive feedback signals from and to send control signals to each valve 100 to control the operation of each valve and thereby control the operation of the pneumatic cylinder 40 and the movement of the probe 10. Air is exhausted from the valve 100 at 104.

This design allows an accurate measurement of the temperature because is measures the energy around the probe 10, not just the material directly in contact with the probe 10. The temperature of packed tobacco leaves is difficult to measure because tobacco is highly insulative. So, the energy from the tobacco leaves touching the probe is transferred, but in typical devices, the energy from the surrounding mass is not transferred. Resistance temperature devices (RTD) are not useful in this context because they are large and cause thermal shunting. Type T thermocouples are small and therefore more suitable, but they are very delicate. The above described assembly provides for the use of the small type T thermocouple and also protects it. This construction is minimally thermally invasive and the cone, preferably of a low friction material such as Lexan®, limits transference of heat from friction from the shaft to the tip, which isolates the tip from the frictional effects of penetration into the mass. Accordingly, this design allows heat to radiate into the tip while protecting the tip from frictional influences and damage during penetration.

A temperature control assembly is recommended to heat or cool the heat conducting structure 62 prior to insertion of the probe 10 into the mass 12 of tobacco product. Temperature measurements are generally more rapid, more accurate and more consistent if the effects of thermal invasion and the accumulative frictional heating of the probe tip during penetration are minimized. Minimizing thermal invasion is particularly important when the temperature probe 10 is used to measure the temperature of tobacco because of the extremely low thermal conductivity characteristic of packed tobacco. Temperature measurements are also improved if the effects of ambient or environmental temperature are also minimized.

More specifically, the accuracy and efficiency of the probe 10 is improved if the probe is neither too hot nor too cold prior to insertion into a mass of tobacco product. The ambient temperature of the processing plant can affect the temperature of the probe prior to insertion. Repeated insertions of the probe into masses of tobacco in successive containers of tobacco on an assembly line can heat the probe 10 from the frictional effect of the tobacco on the probe during insertion.

It has been determined that in the instance in which the probe is used to determine whether the pack temperature of a tobacco mass is above or below a threshold level (e.g., 108 degrees Fahrenheit), the preferred temperature of the heat conducting structure 62 prior to insertion has been found to be substantially in the range of from about 82 degrees Fahrenheit to about 85 degrees Fahrenheit.

A vortec heater 107 and a vortec cooler 108 may be used to raise or lower the temperature, respectively, of the heat conducting structure 62 of the probe 10 prior to insertion. Each vortec heater/cooler 107, 108 receives a supply of compressed air from the compressed air source 102. The air supply to each heater and cooler 107, 108 is controlled by an associated valve 110, 111. Each valve 110, 111 is controlled by the control device 66. In the instance in which the control device 66 is a UDC, each valve 110, 111 may be controlled by means of an alarm contact on the UDC. Alternatively, each valve 110, 111 can be controlled by a PLC. Each valve 110, 111 may be a two port normally closed valve.

The heater 107 and the cooler 108 each include one or more nozzles that direct streams of air at respective predetermined temperatures on the heat conducting structure 62 of the probe 10 when the probe 10 is in its retracted position to heat or cool the heat conducting structure 62, respectively. The vortec heater 107 and the vortec cooler 108 may each be turned on and off by the control device 66 to provide a temperature measuring system with a tunable hysteresis. This control set point may be manipulated to align the indicated temperature to a test measuring device/procedure result. Alternatively, the heater could be provided by an infrared heater and the cooling device could be a fan. Any other appropriate heating or cooling device could be used.

The control device 66 may be programmed and operated to determine the temperature of the heat conducting structure 62 when the probe 10 is in its retracted position (i.e., prior to insertion), to compare the temperature of the heat conducting structure 62 to a pre-determined temperature range. By this, it can be determined whether the temperature of the heat conducting structure 62 is within the predetermined range. Thus, the temperature of the heat conducting structure 62 can be changed if the temperature of the heat conducting structure is outside of the predetermined temperature range by heating the heat conducting structure 62 with the heater 107 or cooling the heat conducting structure 62 with the cooler 108 until the temperature falls within the predetermined temperature range.

The control device 66 can be programmed to determine the temperature of the mass 12, to display the temperature for a human operation (by sending signals to a display screen, for example, or to a printer), to record temperature data in a data base and/or to alert a human operator when a temperature above a threshold or predetermined level is detected. Temperature measurements taken after 20 seconds of insertion or soak time having accuracies of plus or minus 2 degrees Fahrenheit can be realized with a probe constructed according to the principles of the present invention. Longer insertion times (for example, for 60 seconds or 90 seconds) yield more accurate results.

The present disclosure focuses primarily on the construction, the features, the operation and the control of the illustrative temperature probe 10. Although the temperature probe 10 is illustrated mounted on the head out press 26, it can be appreciated that this mounting is not required by the invention. That is, this example is intended to help illustrate the construction and operation of a temperature probe only, but is not intended to limit the scope of the invention. A temperature probe constructed according to the invention may be used by itself or may be mounted on a wide range of structures, including on a wide range of machines used in the processing of tobacco or other agricultural products and is not limited to being used in combination with or mounted on a head out press.

Thus, while the invention has been disclosed and described with reference with a limited number of embodiments, it will be apparent that many variations and modifications may be made thereto without departing from the spirit and scope of the invention and various other modifications may occur to those skilled in the art. Therefore, the following claims are intended to cover modifications, variations, and equivalents thereof.

What is claimed is:

1. A temperature probe for measuring the internal temperature of a mass of packed tobacco product, said temperature probe comprising:

an elongated tubular shaft having a hollow interior;

an insulating structure mounted on said elongated shaft;

a heat conducting structure coupled to said insulating structure;

a thermocouple coupled to said heat conducting structure and extending into the hollow interior of said elongated shaft;

a control device electrically communicated to said thermocouple and operable to determine a temperature from said thermocouple; and a lifting mechanism coupled to the elongated tubular shaft and the control device that moves the heat conducting structure and the elongated tubular shaft between a raised position and a lowered position, wherein when said heat conducting structure is disposed within a mass of packed tobacco product said heat conducting structure transmits thermal energy from the mass to said thermocouple and said insulating structure thermally isolates said heat conducting structure front said tubular shaft.

2. The temperature probe according to claim 1, wherein the heat conducting structure is constructed of metallic material.

3. The temperature probe according to claim 2, wherein metallic material of said heat conducting structure is a selected from a group comprising a brass, a platinum and a gold.

4. The temperature probe according to claim 1, wherein said shaft is constructed of a metallic material.

5. The temperature probe according to claim 4, wherein said metallic material of said shaft is selected from a group comprising a stainless steel and a mild steel.

6. The temperature probe according to claim 1, further comprising support structure mourned within the hollow interior of said tubular shaft that supports a portion of said thermocouple within said interior.

7. The temperture probe according to claim 6, wherein said support structure includes a plurality of cotton fibers.

8. The temperature probe according to claim 1, wherein said tubular shaft has a circular transverse cross-section.

9. The temperature probe according to claim 1, wherein said insulating structure is mounted on an end of said tubular shaft.

10. The temperature probe according to claim 1, wherein said insulating structure is pervious to radiant heat energy.

11. The temperature probe according to claim 1, wherein said insulating structure is constructed of a plastic material.

12. The temperature probe according to claim 11, wherein said plastic material is thermally stable.

13. The temperature probe according to claim 11, wherein said plastic material is a polycarbonate.

14. The temperature probe according to claim 11, wherein said plastic material is high impact polycarbonate.

15. The temperature probe according to claim 1, wherein said heat conducting structure forms a pointed tip on a free end of said probe designed to penetrate a tobacco product mass when said probe is inserted therein.

16. The temperature probe according to claim 15, wherein said heat conducting structure has a conical tip on the end of said probe.

17. The temperature probe according to claim 1, wherein said heat conducting structure acts as a thermal choke.

18. The temperature probe according to claim 17, wherein said thermocouple is coupled to said heat conducting structure substantially in a region of maximum heating of said thermal choke.

19. The temperature probe according to claim 1, wherein said thermocouple is a type T thermocouple.

20. The temperature probe according to claim 1, wherein said thermocouple is micro fine.

21. The temperature probe according to claim 1, wherein said thermocouple is silver soldered to said heat conducting structure.

22. The temperature probe according to claim 1, wherein said control device is a programmable logic control device.

23. The temperature probe according to claim 1, further comprising a temperature control assembly disposed adjacent the heat conducting structure and connected to the control device to selectively change a temperature of the heat conducting structure when in the raised position.

24. A method of determining an internal temperature of a mass of packed tobacco product comprising:

providing a mass of product;

providing a temperature probe comprising an elongated tubular shaft having a hollow interior, an insulating structure mounted on the elongated shaft a heat conducting structure coupled to the insulating structure, a thermocouple coupled to the heat conducting structure and extending into the hollow interior of the elongated shaft, and a control device connected to the thermocouple and operable to determine a temperature from the thermocouple;

determining the temperature of the heat conducting structure;

comparing the temperature of the heat conducting structure to a pre-determined temperature range to determine if the temperature of the heat conducting structure is within the predetermined range;

changing the temperature of the heat conducting structure if the temperature of the heat conducting structure is outside of the predetermined temperature range so that the temperature of the heat conducting structure is within the predetermined temperature range;

inserting the probe into the mass so that the heat conducting structure is disposed in thermal communication with the product on the interior of the mass; and determining the internal temperature of the mass based on information from the probe.

25. The method according to claim 24, wherein a metallic material of said heat conducting structure is selected from group consisting of a brass, a platinum and a gold.

26. The method according to claim 24, further comprising maintaining the heat conducting structure in the mass for a period of time of from about 20 seconds to about 90 seconds.

27. The method according to claim 24, further comprising maintaining the heat conducting structure in the mass for a period of less than two minutes.

28. The method according to claim 24, further comprising thermally isolating the heat conducting structure from the tubular shaft.

29. A temperature probe assembly mounted for insertion into a mass of packed tobacco product for measuring an internal temperature of the mass, comprising:

an insulated shaft;

a heat conducting structure mounted on an end of the insulated shaft;

a temperature controller coupled to the heat conducting structure that maintains the heat conducting structure within a desired temperature range prior to insertion of the shaft into the mass of packed tobacco product;

a temperature sensor coupled to the heat conducting structure that measures the internal temperature of the mass of packed tobacco product when the probe assembly is inserted into the mass of packed tobacco product; and a lifting mechanism coupled to the insulated shaft and the temperature controller that moves the heat conducting structure and the insulated shaft between a raised position and a lowered position.

* * * * *